US012406608B2

(12) United States Patent
Chen et al.

(10) Patent No.: US 12,406,608 B2
(45) Date of Patent: Sep. 2, 2025

(54) DISPLAY COMPENSATION METHOD FOR DISPLAY PANEL, METHOD FOR GENERATING COMPENSATION DATA TABLE, AND DISPLAY DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventors: Xinhong Chen, Guangdong (CN); Zhaopeng Xu, Guangdong (CN); Ling Xu, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/575,204

(22) PCT Filed: Oct. 11, 2023

(86) PCT No.: PCT/CN2023/124063

§ 371 (c)(1),
(2) Date: Dec. 28, 2023

(87) PCT Pub. No.: WO2024/159799

PCT Pub. Date: Aug. 8, 2024

(65) Prior Publication Data

US 2025/0078715 A1 Mar. 6, 2025

(30) Foreign Application Priority Data

Jan. 31, 2023 (CN) ........................ 202310145295.0

(51) Int. Cl.
*G09G 3/20* (2006.01)

(52) U.S. Cl.
CPC ... *G09G 3/2074* (2013.01); *G09G 2320/0233* (2013.01); *G09G 2320/028* (2013.01);
(Continued)

(58) Field of Classification Search
CPC ......... G09G 3/2074; G09G 2320/0233; G09G 2320/0626
See application file for complete search history.

(56) References Cited

U.S. PATENT DOCUMENTS

2019/0221173 A1* 7/2019 Lee ........................ G02F 1/1323

FOREIGN PATENT DOCUMENTS

CN 107358929 A 11/2017
CN 112767891 A 5/2021
(Continued)

OTHER PUBLICATIONS

International Search Report in International application No. PCT/CN2023/124063, mailed on Feb. 4, 2024.
(Continued)

*Primary Examiner* — Adam R. Giesy
(74) *Attorney, Agent, or Firm* — PV IP PC; Wei Te Chung

(57) ABSTRACT

The present disclosure provides a display compensation method for a display panel, a method for generating a compensation data table, and a display device. A first display luminance corresponding to a first to-be-compensated sub-pixel set and a second display luminance corresponding to a second to-be-compensated sub-pixel set are respectively compensated by corresponding compensation data tables in different viewing angles. A plurality of first compensation data tables corresponding to the first viewing angle and a plurality of second compensation data tables corresponding
(Continued)

to the second viewing angle are used to compensate for the first to-be-compensated sub-pixel set and the second to-be-compensated sub-pixel sets adjacent with each other.

15 Claims, 8 Drawing Sheets

(52) U.S. Cl.
CPC .............. *G09G 2320/0285* (2013.01); *G09G 2320/0626* (2013.01)

(56) References Cited

FOREIGN PATENT DOCUMENTS

| | | | |
|---|---|---|---|
| CN | 113903304 | A | 1/2022 |
| CN | 114783335 | A | 7/2022 |
| KR | 20140058149 | A | 5/2014 |
| WO | 2020107648 | A1 | 6/2020 |

OTHER PUBLICATIONS

Written Opinion of the International Search Authority in International application No. PCT/CN2023/124063, mailed on Feb. 4, 2024.

* cited by examiner

Determining two first target compensation data blocks respectively in the two first target compensation data tables

↓

Obtaining two first compensation values as the two first reference compensation values, based on compensation values at vertex positions of the two first target compensation data blocks and the first coordinate information

FIG. 1D

Determining two second target compensation data blocks respectively in the two second target compensation data tables

↓

Obtaining two second compensation values as the two second reference compensation values, based on compensation values at vertex positions of the two second target compensation data blocks and the second coordinate information

FIG. 1E

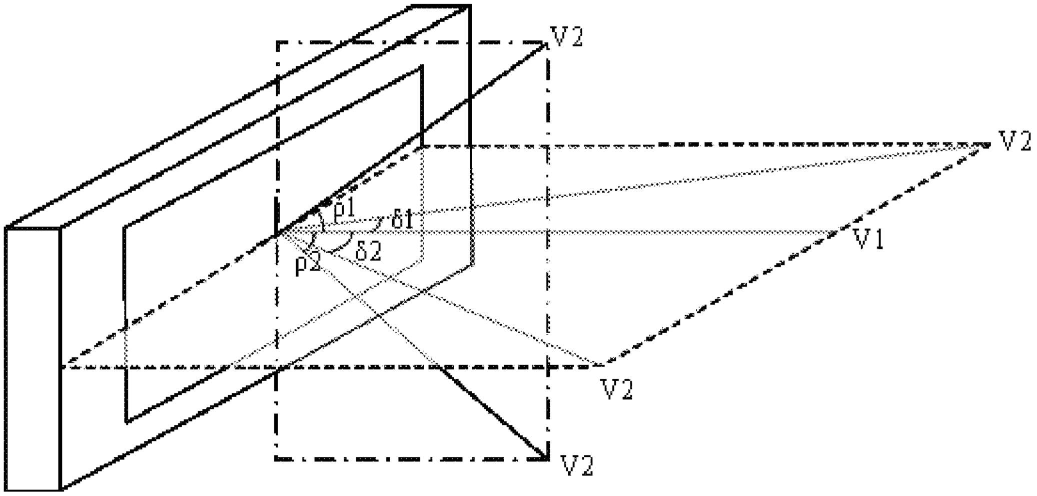

FIG. 2

DISPLAY COMPENSATION METHOD FOR DISPLAY PANEL, METHOD FOR GENERATING COMPENSATION DATA TABLE, AND DISPLAY DEVICE

TECHNICAL FIELD

The present disclosure relates to a display technology field, and more particularly, to a display compensation method for a display panel, a method for generating a compensation data table, and a display device.

BACKGROUND

In a current display device, in order to improve luminance uniformity (or mura), an industrial camera is often used to perform feature extraction on a position where luminance uniformity occurs and a degree of luminance uniformity, and then the extracted feature is calculated to obtain reverse grayscale data corresponding to the extracted feature, so as to improve luminance uniformity of a product. However, the accuracy of the feature extraction directly affects the luminance compensation effect. In addition, in different viewing angles, the display panel exhibits various features for luminance uniformity, and only one compensation value can be applied to one pixel. Therefore, the existing method for improving display uniformity can only improve the display uniformity in a fixed viewing angle.

SUMMARY

An embodiment of the present disclosure provides a display compensation method for a display panel, a method for generating a compensation data table, and a display device, which can improve the display uniformity in different viewing angles.

An embodiment of the present disclosure provides a display compensation method for a display panel, including selecting a plurality of first compensation data tables for a first to-be-compensated sub-pixel set in a first viewing angle, as a first target compensation data set, and selecting a plurality of second compensation data tables for a second to-be-compensated sub-pixel set in second viewing angle, as a second target compensation data set; wherein the first to-be-compensated sub-pixel set is adjacent to the second to-be-compensated sub-pixel set, and the first viewing angle is different from the second viewing angle; and generating a first target compensation value based on the first target compensation data set to compensate for a first display luminance of a first sub-pixel to be compensated comprised in the first to-be-compensated sub-pixel set; generating a second target compensation value based on the second target compensation data set to compensate for a second display luminance of a second sub-pixel to be compensated comprised in the second to-be-compensated sub-pixel set.

The present disclosure also provides a method for generating a compensation data table for compensating luminance uniformity of a display panel including a plurality of sub-pixels. The method includes: obtaining a plurality of pieces of luminance data of a plurality of sub-pixels corresponding to a plurality of binding point grayscales in different viewing angles; and generating a plurality of compensation data tables based on a difference between the luminance data of the plurality of sub-pixels corresponding to the plurality of binding point grayscales in the different viewing angles and expected luminance data, wherein the plurality of compensation data tables comprise a plurality of first compensation data tables in the first viewing angle and a plurality of second compensation data tables in the second viewing angle, the plurality of first compensation data tables are configured to compensate for first display luminance of a first sub-pixel to be compensated comprised in a first to-be-compensated sub-pixel set, and the plurality of second compensation data tables are configured to compensate for second display luminance of a second sub-pixel to be compensated comprised in a second to-be-compensated sub-pixel set, the first to-be-compensated sub-pixel set is adjacent to the second to-be-compensated sub-pixel set, and the first viewing angle is different from the second viewing angle.

The present disclosure also provides a display device including a display panel, a storage module, and a control module. The display panel includes a first to-be-compensated sub-pixel set and a second to-be-compensated sub-pixel set adjacent with each other; The storage module is configured to store a plurality of first compensation data tables and a plurality of second compensation data tables, wherein the plurality of the first compensation data tables correspond to a first viewing angle, the plurality of the second compensation data tables correspond to a second viewing angle, and the first viewing angle is different from the second viewing angle. The control module is configured to select the plurality of the first compensation data tables in the first viewing angle for the first to-be-compensated sub-pixel set, as a first target compensation data set, and generate a first target compensation value based on the first target compensation data set to compensate for first display luminance of a first sub-pixel to be compensated comprised in the first to-be-compensated sub-pixel set; and select the plurality of the second compensation data tables in the second viewing angle for the second to-be-compensated sub-pixel set, as a second target compensation data set, and generate a second target compensation value based on the second target compensation data set to compensate for second display luminance of a second sub-pixel to be compensated comprised in the second to-be-compensated sub-pixel set.

Beneficial Effect

Compared with the prior art, the present disclosure provides a display compensation method for a display panel, a method for generating a compensation data table, and a display device. Since the first to-be-compensated sub-pixel sets and the second to-be-compensated sub-pixel sets adjacent with each other respectively are respectively compensated by compensation data tables in different viewing angles to obtain compensation values corresponding to different viewing angles. Therefore, the problem of the uniform display of the display panel at different viewing angles can be improved. In the method of generating the compensation data table, a plurality of compensation data tables includes a plurality of first compensation data tables corresponding to a first viewing angle and a plurality of second compensation data tables corresponding to a second viewing angle, so that the plurality of first compensation data tables are configured to compensate for a first display luminance of a first sub-pixel to be compensated included in the first to-be-compensated sub-pixel set, and the plurality of second compensation data tables are configured to compensate for a second display luminance of a second sub-pixel to be compensated included in the second to-be-compensated sub-pixel set. The display device includes a display panel, a storage module, and a control module.

BRIEF DESCRIPTION OF THE DRAWINGS

FIG. 1A to 1E is a flowchart of a display compensation method according to an embodiment of the present disclosure;

FIG. 2 is a schematic view of a viewing angle according to an embodiment of the present disclosure;

DETAILED DESCRIPTION

Figure 1A:
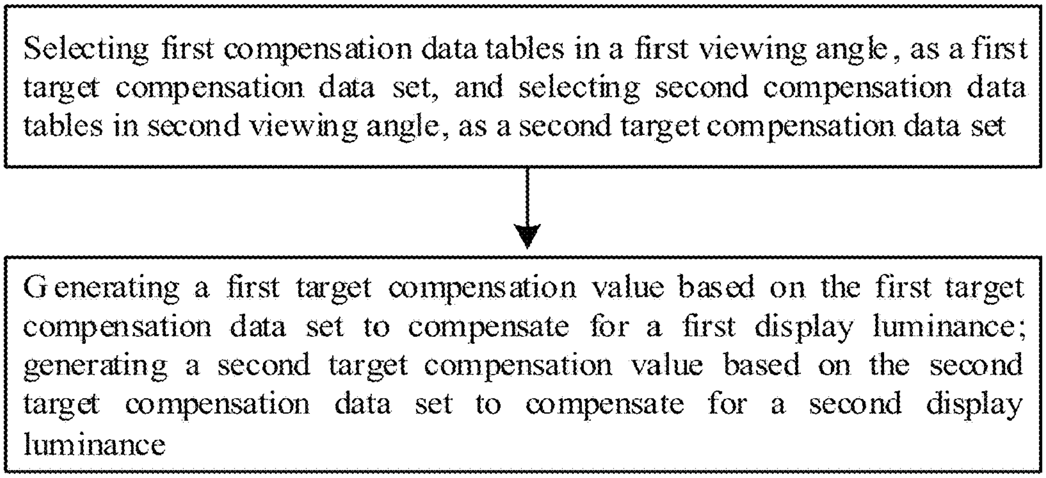

In order that the objectives, technical solutions, and effects of the present disclosure may be made clearer and more clarity, the present disclosure will be described in further detail below with reference to the accompanying drawings, by way of example. It is to be understood that the specific embodiments described herein are merely illustrative of the present disclosure and are not intended to limit the present disclosure.

Specifically, FIG. 1A to FIG. 1E are flowcharts of a display compensation method according to an embodiment of the present disclosure. An embodiment of the present disclosure provides a display compensation method of a display panel for improving display uniformity of the display panel in various viewing angles.

Alternatively, the display panel includes a liquid crystal display panel, an organic light emitting diode display panel, a sub-millimeter light emitting diode display panel, a micro light emitting diode display panel, and the like.

The display panel includes a plurality of sub-pixels. Alternatively, the display panel further includes a pixel drive circuit, a touch electrode, a sensing element, and the like electrically connected to a plurality of sub-pixels.

The display compensation method includes:

selecting a plurality of first compensation data tables in a corresponding first viewing angle for a first to-be-compensated sub-pixel set, as a first target compensation data set, and selecting a plurality of second compensation data tables in corresponding second viewing angle for a second to-be-compensated sub-pixel set, as a second target compensation data set; where the first to-be-compensated sub-pixel set is adjacent to the second to-be-compensated sub-pixel set, and the first viewing angle is different from the second viewing angle;

generating a first target compensation value based on the first target compensation data set to compensate for a first display luminance corresponding to a first sub-pixel to be compensated included in the first to-be-compensated sub-pixel set; generating a second target compensation value based on the second target compensation data set to compensate for a second display luminance corresponding to a second sub-pixel to be compensated included in the second to-be-compensated sub-pixel set.

Alternatively, the coordinate information of the sub-pixel may be obtained by a control module to determine whether the sub-pixel is a sub-pixel to be compensated. In response to determining that the sub-pixel is a sub-pixel to be compensated, a plurality of data compensation data tables in the corresponding viewing angle is selected as a target compensation data set based on the to-be-compensated sub-pixel set in which the sub-pixel to be compensated is included, so as to generate a target compensation value to compensate the display luminance of the sub-pixel to be compensated. Where the sub-pixel to be compensated includes a first sub-pixel to be compensated and a second sub-pixel to be compensated.

Alternatively, the coordinate information of the sub-pixel to be compensated may be stored in a storage module in advance. Thus, it may be determined whether the sub-pixel is a sub-pixel to be compensated by simply determining whether the coordinate information of the sub-pixel is the same as the marked coordinate information of the marked sub-pixel with the uneven display performance that has been stored. That is, in response to determining that the coordinate information of the sub-pixel is the same as the marked coordinate information, it is determined that the sub-pixel may be the sub-pixel to be compensated. Further, the marked coordinate information includes first marked coordinate information and second marked coordinate information. In response to determining that the coordinate information of the sub-pixel is the same as the first marked coordinate information, it may be determined that the sub-pixel is a first sub-pixel to be compensated. In response to determining that the coordinate information of the sub-pixel is the same as the second marked coordinate information, it may be determined that the sub-pixel is a second sub-pixel to be compensated.

Alternatively, coordinate information of the first sub-pixel to be compensated is obtained by the control module to select a plurality of first compensation data tables in the corresponding first viewing angle for the first sub-pixel to be compensated as the first target compensation data set, thereby generating a first target compensation value to compensate for the first display luminance corresponding to the first sub-pixel to be compensated.

Alternatively, coordinate information of the second sub-pixel to be compensated is obtained by the control module to select a plurality of second compensation data tables in the corresponding second viewing angle for the second sub-pixel to be compensated as the second target compensation data set, thereby generating a second target compensation value to compensate for the second display luminance corresponding to the second sub-pixel to be compensated.

Alternatively, the plurality of first compensation data tables and the plurality of second compensation data tables may be stored in the storage module. The grayscale compensation value information and the coordinate information under the grayscale of the corresponding binding point are recorded in each first compensation data table and each second compensation data table.

Alternatively, the first viewing angle is one of a front viewing angle and a side viewing angle, and the second viewing angle is the other of the front viewing angle and the side viewing angle. Alternatively, a plurality of the second compensation data tables may correspond to the same side viewing angle, or may correspond to different side viewing angles.

FIG. 2 is a schematic view of a viewing angle according to an embodiment of the present disclosure. If the viewing angle perpendicular to a surface of the display panel at the center of the display panel is the first viewing angle V1, the second viewing angle V2 may be one among −70° to +70° (δ1≤70°, δ2≥−70°, ρ1≤70°, ρ2≥−70° in FIG. 2). The second viewing angle includes a left side viewing angle, a right side viewing angle, a top viewing angle, and a bottom viewing angle.

Alternatively, δ1 may be selected from one of 1°, 2°, . . . , 10°, 11°, . . . , 20°, 21°, . . . , 30°, 31°, . . . , 40°, 41°, . . . , 50°, 51°, . . . , 60°, 61°, . . . , 69°, or 70°. Alternatively, δ2 may be selected from one of −1°, −2°, . . . , −10°, −11°, . . . , −20°, −21°, . . . , −30°, −31°, . . . , −40°, −41°, . . . , −50°, −51°, . . . , −60°, −61°, . . . , −69° or −70°. Alternatively, ρ1 may be selected from one of 1°, 2°, . . . , 10°, 11°, . . . , 20°, 21°, . . . , 30°, 31°, . . . , 40°, 41°, . . . , 50°, 51°, . . . , 60°, 61°, . . . , 69°, or 70°. Alternatively, ρ2 may be selected from one of −1°, −2°, . . . , −10°, −11°, . . . , −20°, −21°, . . . , −30°, −31°, . . . , −40°, −41°, . . . , −50°, −51°, . . . , −60°, −61°, . . . , −69°, or −70°.

Since the compensation data tables corresponding to the different viewing angles is used as the target compensation data set for the first sub-pixel to be compensated and the second sub-pixel to be compensated, so as to generate the target compensation value in the different viewing angles to realize non-uniform display compensation. Therefore, the compensation effect in the different viewing angles may be combined to improve the non-uniform display of the display panel in the different viewing angles.

Alternatively, depending on the division manner for dividing the first to-be-compensated sub-pixel set and the second to-be-compensated sub-pixel set, the arrangement of the first sub-pixel to be compensated included in the first to-be-compensated sub-pixel set is different from that of the second sub-pixel to be compensated included in the second to-be-compensated sub-pixel set. Accordingly, the application of the first to-be-compensated data table is different from that of the second to-be-compensated data table.

FIGS. 3A to 3E is a schematic diagram of the application of the first compensation data table and the second compensation data table. Alternatively, each to-be-compensated sub-pixel set may correspond to at least one row of sub-pixels, to at least one column of sub-pixels, or to at least one sub-pixel, respectively. Accordingly, in response to determining that the to-be-compensated sub-pixel set corresponds to at least one row sub-pixel or at least one column sub-pixel, a plurality of sub-pixels included in the at least one row sub-pixel or at least one column sub-pixel corresponding to the to-be-compensated sub-pixel set include the sub-pixel to be compensated included in the to-be-compensated sub-pixel set.

Alternatively, the first to-be-compensated sub-pixel set includes a plurality of the first sub-pixels to be compensated located in an odd row or an odd column. The second to-be-compensated sub-pixel set includes a plurality of the second sub-pixels to be compensated located in an even row or an even column. Accordingly, the application of the first compensation data table corresponds to a plurality of the first sub-pixels to be compensated located in an odd row or an odd column, and the application of the second compensation data table corresponds to a plurality of the second sub-pixels to be compensated located in an even row or an even column.

Alternatively, the application of the first compensation data table and the application of the second compensation data table may be obtained based on parity information of the row or the column in which the sub-pixel to be compensated is located.

Figure 3A:
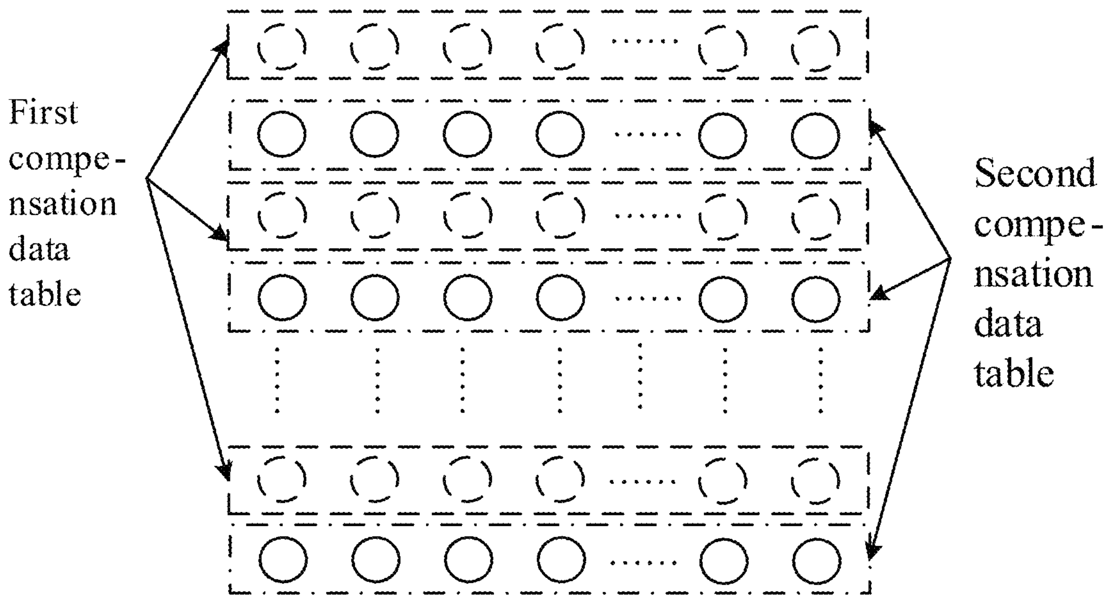
FIGS. 3A to 3E is a schematic diagram of the application of a first compensation data table and a second compensation data table.

For example, the sub-pixel to be compensated is located in row X and in column Y, and then the coordinate information of the sub-pixel to be compensated is (X, Y). The first to-be-compensated sub-pixel set includes a plurality of first sub-pixels to be compensated located in odd rows, and the second to-be-compensated sub-pixel set includes a plurality of second to-be-compensated sub-pixels located in even rows. Thus, the applications of the first compensation data table and the second compensation data table may be obtained on the basis of the parity of X. That is, the to-be-compensated sub-pixel located in an odd row (i.e., X is odd, Y is odd or even, and the to-be-compensated sub-pixel is the first to-be-compensated sub-pixel) employs a plurality of first compensation data tables in the corresponding first viewing angle as the first target compensation data set, so as to generate the first target compensation value, thereby compensating for the display luminance corresponding to the sub-pixel to be compensated (i.e., compensating for the first display luminance). The to-be-compensated sub-pixel located in an even row (i.e., X is even, Y is odd or even, and the to-be-compensated sub-pixel is the second to-be-compensated sub-pixel) employs a plurality of second compensation data tables in the corresponding second viewing angle as the second target compensation data set, so as to generate the second target compensation value, thereby compensating for the display luminance corresponding to the sub-pixel to be compensated (i.e., compensating for the second display luminance), as shown in FIG. 3A.

Figure 3B:
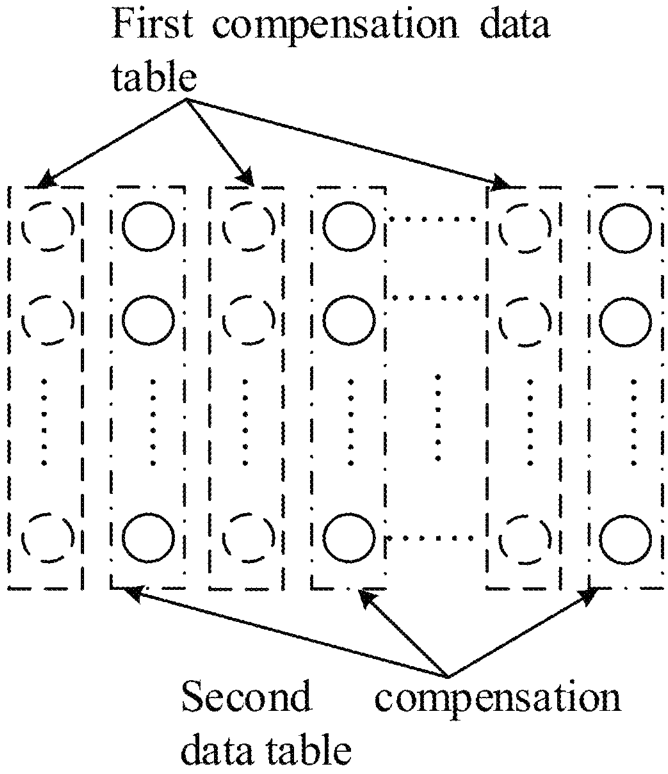

The first to-be-compensated sub-pixel set includes a plurality of first sub-pixels to be compensated located in odd columns, and the second to-be-compensated sub-pixel set includes a plurality of second to-be-compensated sub-pixels located in even columns. Thus, the applications of the first compensation data table and the second compensation data table may be obtained on the basis of the parity of Y. That is, the to-be-compensated sub-pixel located in an odd column (i.e., X is odd or even, Y is odd, and the to-be-compensated sub-pixel is the first to-be-compensated sub-pixel) employs a plurality of first compensation data tables in the corresponding first viewing angle as the first target compensation data set, so as to generate the first target compensation value, thereby compensating for the display luminance corresponding to the sub-pixel to be compensated (i.e., compensating for the first display luminance). The to-be-compensated sub-pixel located in an even column (i.e., X is even or odd, Y is even, and the to-be-compensated sub-pixel is the second to-be-compensated sub-pixel) employs a plurality of second compensation data tables in the corresponding second viewing angle as the second target compensation data set, so as to generate the second target compensation value, thereby compensating for the display luminance corresponding to the sub-pixel to be compensated (i.e., compensating for the second display luminance), as shown in FIG. 3B.

Alternatively, the first to-be-compensated sub-pixel set includes at least two adjacent rows of first sub-pixel rows or at least two adjacent columns of first sub-pixel columns. The second to-be-compensated sub-pixel set includes at least two adjacent rows of second sub-pixel rows or at least two adjacent columns of second sub-pixel columns. The first sub-pixel row or the first sub-pixel column includes a plurality of the first sub-pixels to be compensated, and the second sub-pixel row or the second sub-pixel column includes a plurality of the second sub-pixels to be compensated.

Figure 3C:
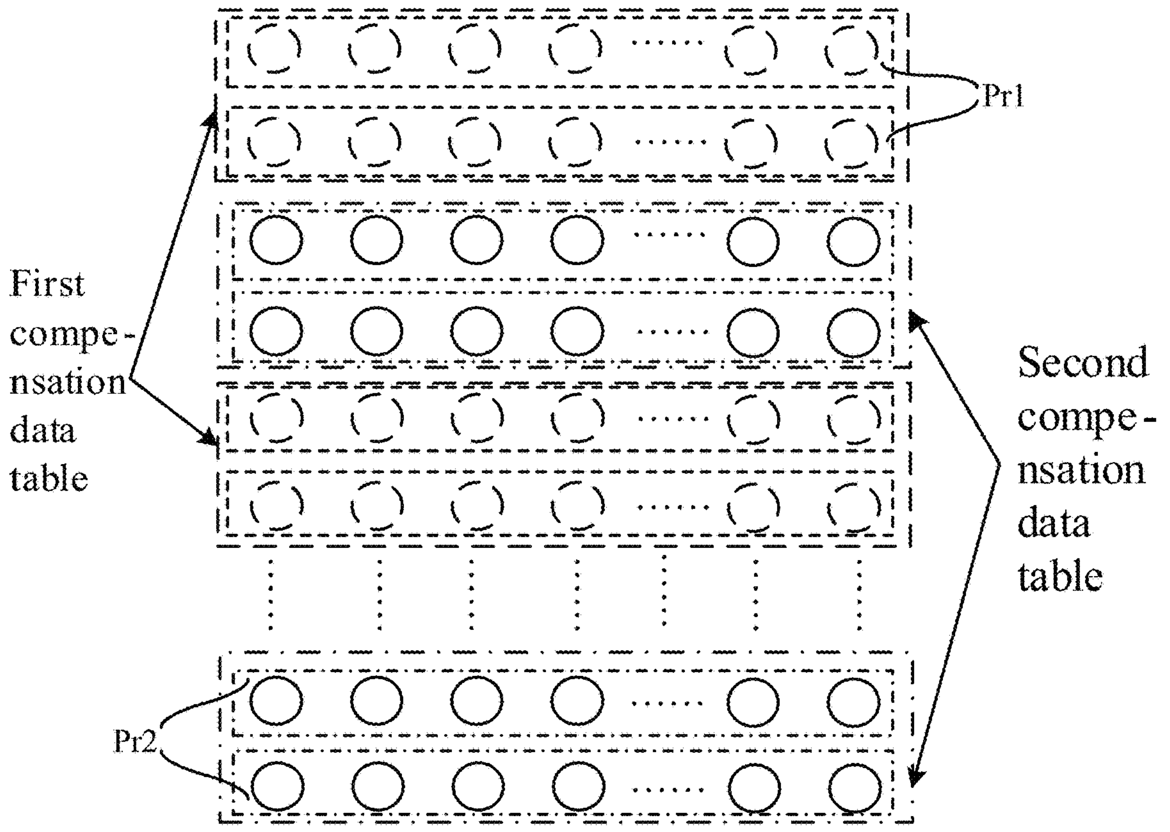

Specifically, the first to-be-compensated sub-pixel set includes at least two adjacent rows of first sub-pixel rows (Pr1 in FIG. 3C) and the second to-be-compensated sub-pixel set includes at least two adjacent rows of second sub-pixel rows (Pr2 in FIG. 3C).

Figure 3D:
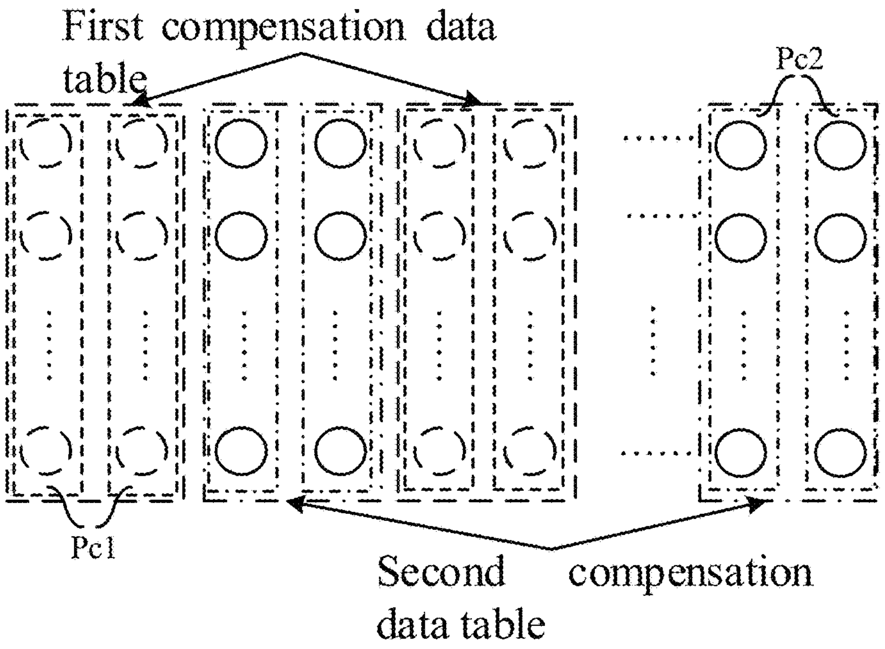

In particular, the second to-be-compensated sub-pixel set includes at least two adjacent columns of first sub-pixel columns (Pc1 in FIG. 3D) and the second to-be-compensated sub-pixel set includes at least two adjacent columns of second sub-pixel columns (Pc2 in FIG. 3D).

The first sub-pixel row or the first sub-pixel column includes a plurality of the first sub-pixels to be compensated, and the second sub-pixel row or the second sub-pixel column includes a plurality of the second sub-pixels to be compensated.

Alternatively, it is determined whether the sub-pixel may be the first sub-pixel to be compensated or the second sub-pixel to be compensated by comparing the coordinate information of the sub-pixels, to obtain the applications of the first compensation data table and the second compensation data table.

Alternatively, the first to-be-compensated sub-pixel set includes a plurality of the first sub-pixels to be compensated located in the odd row and the odd column and located in the even row and the even column. The second to-be-compensated sub-pixel set includes a plurality of the second sub-pixels to be compensated located in the odd row and the even column and located in the even row and the odd column, so that the application of the first compensation data table overlaps the application of the second compensation data table, so as to reduce the probability of a stripe-type display of the display panel while improving display uniformity of the display panel, thereby facilitating improvement of the display effect of the display panel.

Alternatively, the application of the first compensation data table and the application of the second compensation data table may be obtained based on parity information of the row or the column in which the sub-pixel to be compensated is located.

Figure 3E:
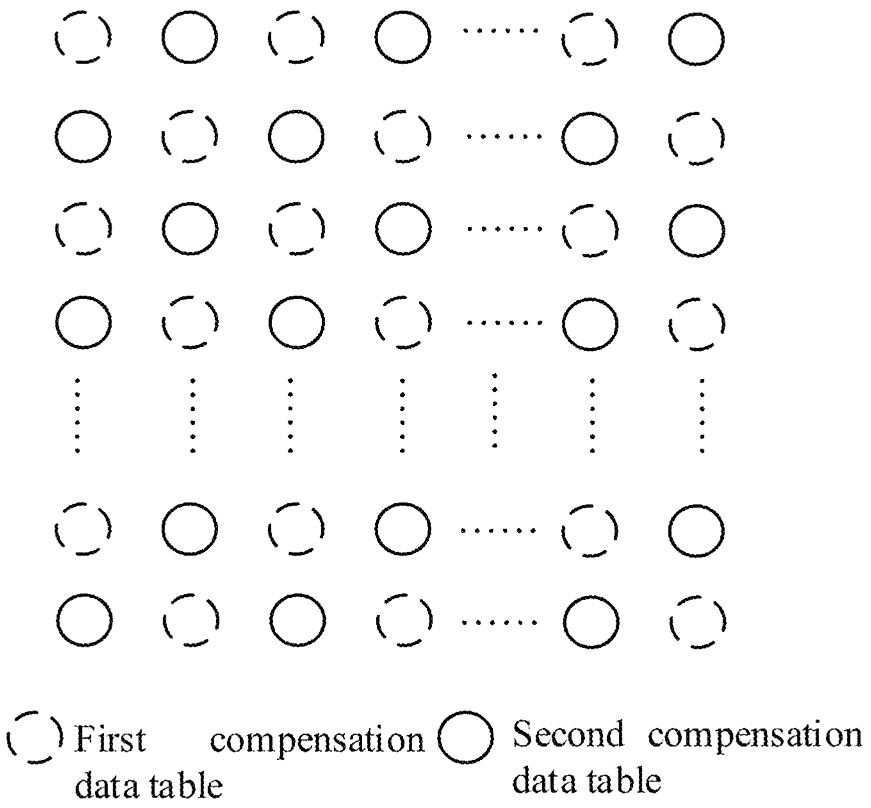

For example, the sub-pixel to be compensated is located in row X and in column Y, and then the coordinate information of the sub-pixel to be compensated is (X, Y). The first to-be-compensated sub-pixel set includes a plurality of first sub-pixels to be compensated located in odd and even rows and in odd and even columns, and the second to-be-compensated sub-pixel set includes a plurality of second to-be-compensated sub-pixels located in odd and even rows and in odd and even columns. Thus, the applications of the first compensation data table and the second compensation data table may be obtained on the basis of the parities of X and Y. That is, the to-be-compensated sub-pixel located in an odd row and an odd column (i.e., each of X and Y is odd, and the to-be-compensated sub-pixel is the first to-be-compensated sub-pixel) and the to-be-compensated sub-pixel located in an even row and an even column (i.e., each of X and Y is even, and the to-be-compensated sub-pixel is the first to-be-compensated sub-pixel) employ a plurality of first compensation data tables in the corresponding first viewing angle as the first target compensation data set, so as to generate the first target compensation value, thereby compensating for the display luminance corresponding to the sub-pixel to be compensated (i.e., compensating for the first display luminance). The first to-be-compensated sub-pixel set includes a plurality of first sub-pixels to be compensated located in odd and even rows and in odd and even columns, and the second to-be-compensated sub-pixel set includes a plurality of second to-be-compensated sub-pixels located in odd and even rows and in odd and even columns. Thus, the applications of the first compensation data table and the second compensation data table may be obtained on the basis of the parities of X and Y. That is, the to-be-compensated sub-pixel located in an odd row and an even column (i.e., X is odd and Y is even, and the to-be-compensated sub-pixel is the second to-be-compensated sub-pixel) and the to-be-compensated sub-pixel located in an even row and an odd column (i.e., X is even and Y is odd, and the to-be-compensated sub-pixel is the second to-be-compensated sub-pixel) employ a plurality of second compensation data tables in the corresponding second viewing angle as the second target compensation data set, so as to generate the second target compensation value, thereby compensating for the display luminance corresponding to the sub-pixel to be compensated (i.e., compensating for the first display luminance), as shown in FIG. 3E.

In order to achieve compensation for different display grey levels of the display panel while reducing the amount of storage, the plurality of first compensation data tables includes a target compensation data table corresponding to a plurality of first tie point grey levels, and the plurality of second compensation data tables includes a target compensation data table corresponding to a plurality of second tie point grey levels. Thus, when compensating the sub-pixel to be compensated, after confirming the selection of a plurality of first compensation data tables or a plurality of second compensation data tables as a target compensation data set, a target compensation data table which is similar to a grey scale to be displayed for the sub-pixel to be compensated may be further selected in the target compensation data set to generate said target compensation value. The plurality of first tie point grey levels are not same as each other and the plurality of second tie point grey levels are not same as each other.

Figure 4:
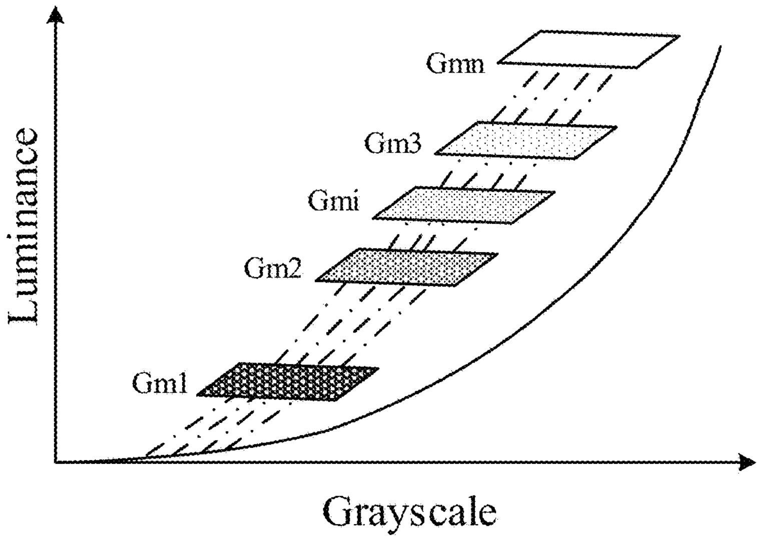
FIG. 4 is a schematic diagram of a target compensation data set according to an embodiment of the present disclosure.

FIG. 4 is a schematic diagram of a target compensation data set according to an embodiment of the present disclosure. The target compensation value includes a plurality of target compensation data tables corresponding to different tie point grayscales (Gm1, Gm2, Gm3, . . . , Gmn). m1 is greater than or equal to 0, and m2>m1, m3>m2, mn are greater than m3 and less than or equal to the highest grayscale of the display panel. Gm1, Gm2, Gm3, . . . , Gmn may represent a plurality of first tie point grayscales, or may represent a plurality of second tie point grayscales.

Alternatively, in response to determining that the grayscale to be displayed by the sub-pixel to be compensated is equal to the binding point grayscale corresponding to a certain target compensation data table in the target compensation data set, the target compensation value may be generated directly from the target compensation data table to compensate for the display luminance of the sub-pixel to be compensated.

Alternatively, in response to determining that the grayscale to be displayed by the sub-pixel to be compensated is different from the binding point grayscale corresponding to the plurality of target compensation data tables in the target compensation data set, the target compensation value may be generated by selecting two target compensation data tables of the plurality of target compensation data tables similar to the grayscale to be displayed by the sub-pixel to be compensated (Gmi in FIG. 4 is a compensation data table corresponding to the grayscale to be displayed by the sub-pixel to be compensated, and Gmi may be obtained by interpolation calculation by using Gm2, Gm3, and a gamma curve).

Figure 1B:
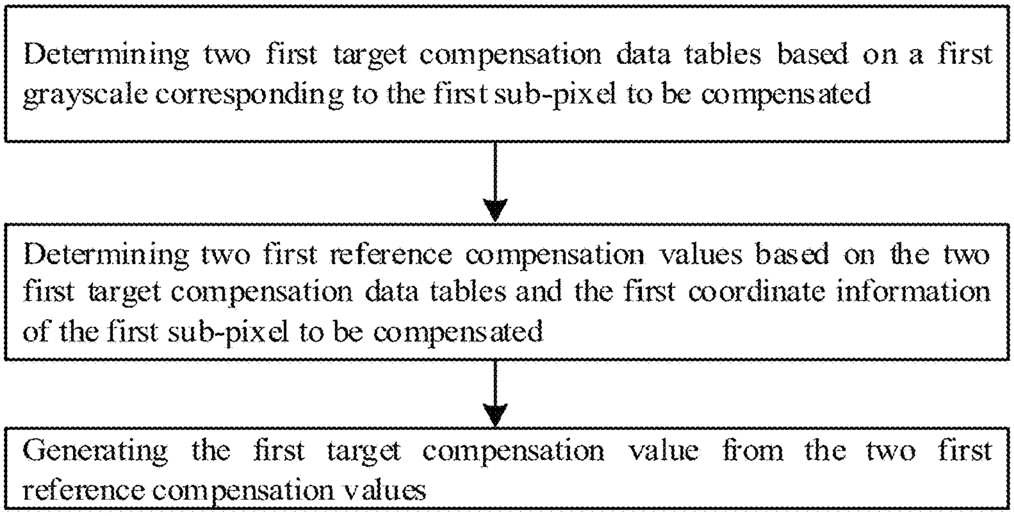

Accordingly, referring to FIG. 1B, the step of generating a first target compensation value based on the first target compensation data set to compensate for a first display luminance corresponding to a first sub-pixel to be compensated included in the first to-be-compensated sub-pixel set further includes:

- determining two first target compensation data tables from the first target compensation data set based on a first grayscale corresponding to the first sub-pixel to be compensated; where the first grayscale is between two first binding point grayscales corresponding to the two first target compensation data tables;
- determining two first reference compensation values corresponding to the first coordinate information of the first sub-pixel to be compensated in the two first target compensation data tables based on the two first target compensation data tables and the first coordinate information of the first sub-pixel to be compensated; and
- generating the first target compensation value from the two first reference compensation values.

Figure 1C:
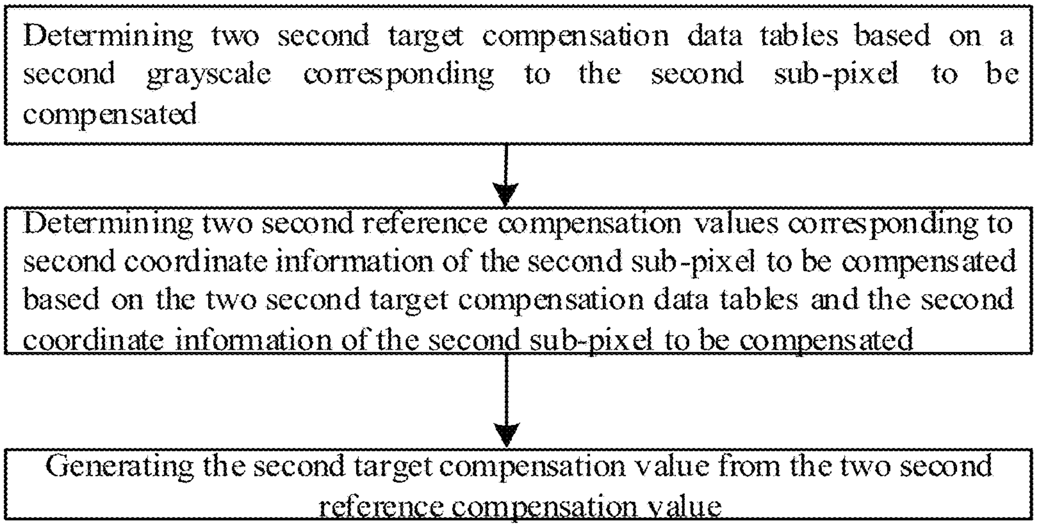

Accordingly, referring to FIG. 1C, the step of generating a second target compensation value from the second target compensation data set to compensate for a second display luminance corresponding to a second sub-pixel to be compensated included in the second to-be-compensated sub-pixel set includes:

- determining two second target compensation data tables from the second target compensation data set based on a second grayscale corresponding to the second sub-pixel to be compensated; Where the second grayscale is between two second binding point grayscales corresponding to the two second target compensation data tables;
- determining two second reference compensation values corresponding to the second coordinate information of the second sub-pixel to be compensated in the two second target compensation data tables based on the two second target compensation data tables and the second coordinate information of the second sub-pixel to be compensated; and
- generating the second target compensation value from the two second reference compensation values.

Alternatively, the compensation value in each compensation data table may correspond to one sub-pixel, or may correspond to one area (for example, in the case of the ultra-high definition display panel, 3840 sub-pixels are arranged in each row of the display panel, and 2160 sub-pixels are arranged in each column, and after the sub-pixels of the display panel are decomposed based on the parity of Y in the coordinate information, each compensation data table may include 241×271 compensation data blocks). when the compensation value corresponds to one area, bilinear interpolation calculation may be performed based on the coordinate information and the compensation value at a corresponding vertex position in the target compensation data block, to obtain a corresponding reference compensation value.

Alternatively, as shown in FIG. 1D, the step of determining two first reference compensation values corresponding to the first coordinate information of the first sub-pixel to be compensated in the two first target compensation data tables based on the two first target compensation data tables and the first coordinate information of the first sub-pixel to be compensated includes:

- respectively determining, in the two first target compensation data tables, two first target compensation data blocks corresponding to the first coordinate information of the first sub-pixel to be compensated in the two first target compensation data tables; and
- in the two first target compensation data blocks, obtaining, as the two first reference compensation values, two first compensation values corresponding to a mapping position of the first coordinate information of the first sub-pixel to be compensated, based on the compensation values at the corresponding vertex position in the two first target compensation data blocks and the first coordinate information of the first sub-pixel to be compensated.

Alternatively, as shown in FIG. 1E, the step of determining two second reference compensation values corresponding to the second coordinate information of the second sub-pixel to be compensated in the two second target compensation data tables based on the two second target compensation data tables and the second coordinate information of the second sub-pixel to be compensated includes:

- respectively determining, in the two second target compensation data tables, two second target compensation data blocks corresponding to the second coordinate information of the second sub-pixel to be compensated; and
- in the two second target compensation data blocks, obtaining, as the two second reference compensation values, two second compensation values corresponding to a mapping position of the second coordinate information of the second sub-pixel to be compensated are obtained as the two second reference compensation values based on the compensation values at the corresponding vertex positions of the two second target compensation data blocks and the second coordinate information of the second sub-pixel to be compensated.

Figure 5:
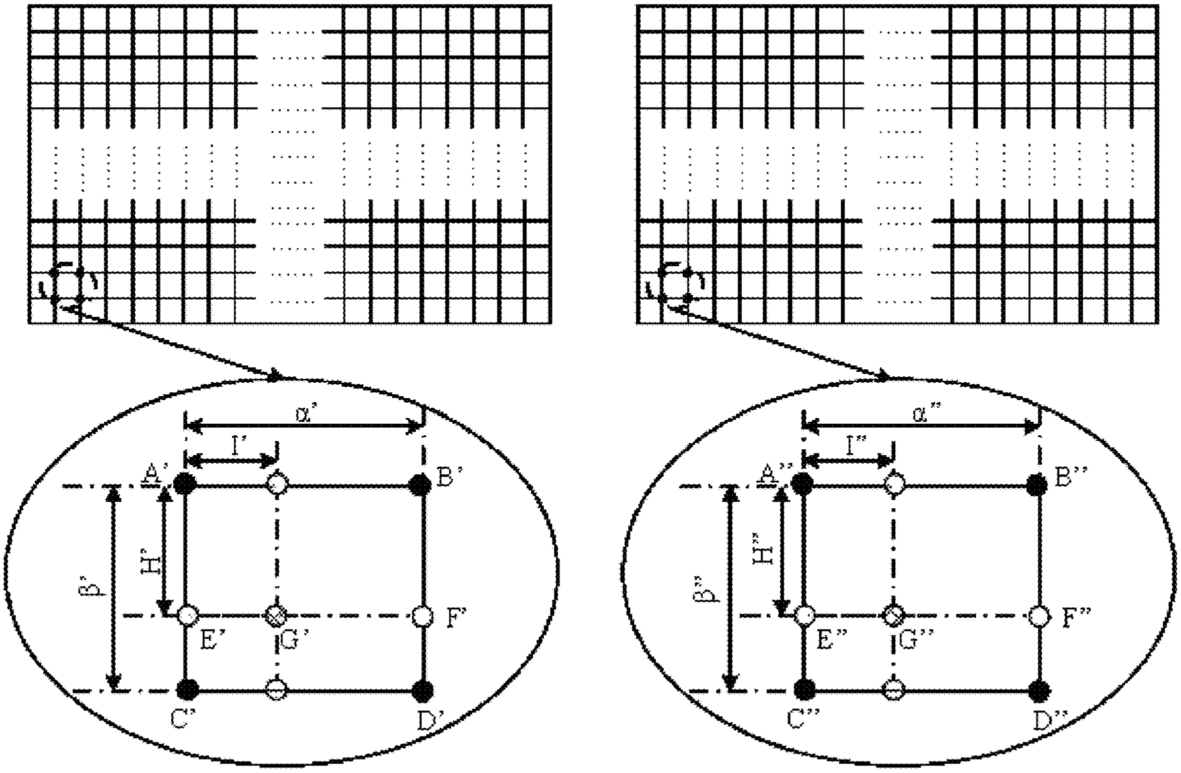
FIG. 5 is a schematic diagram of obtaining a reference compensation value according to an embodiment of the present disclosure.

FIG. 5 is a schematic diagram of obtaining a reference compensation value according to an embodiment of the present disclosure. Two first target compensation data tables have been determined from the first target compensation data set, and corresponding first target compensation data blocks have been determined from the two first target compensation data tables. If the position in the first target compensation data block corresponding to the coordinate position of the first sub-pixel to be compensated is a position G', the compensation value (i.e., the first reference compensation value) corresponding to the position G' may be obtained from the compensation value (i.e., A', B', C', and D') at the vertex position in the first target compensation data block and the first coordinate information of the first sub-pixel to be compensated. That is, $E'=[(\beta'-H')*A'+H'*C']/\beta'$; $F'=[(\beta'-H')*B'+H'*D']/\beta'$; $G'=[(\alpha'-I')*E'+I'*F']/\alpha'$. Two second target compensation data tables have been determined from the second target compensation data set, and corresponding second target compensation data blocks have been determined from the two second target compensation data tables. If the position in the second target compensation data block corresponding to the coordinate position of the second sub-pixel to be compensated is a position G", the compensation value (i.e., the first reference compensation value) corresponding to the position G" may be obtained from the compensation value (i.e., A', B', C', and D') at the vertex position in the second target compensation data block and the second coordinate information of the first sub-pixel to be compensated. That is, E"=[(β"−H")*A"+H"*C"]/β"; F"=[(β"−H")*B"+H"*D"]/β"; G"=[(α"−I")*E"+I"*F"]/α'.

Alternatively, the step of generating the first target compensation value from the two first reference compensation values includes: performing a linear interpolation operation on the two first reference compensation values to obtain the first target compensation value. The step of generating the second target compensation value from the two second reference compensation values includes: performing a linear interpolation operation on the two second reference compensation values to obtain the second target compensation value.

According to the display compensation method according to an embodiment of the present disclosure, compensation values corresponding to different viewing angles are obtained by adjacent first to-be-compensated sub-pixel sets and adjacent second to-be-compensated sub-pixel sets (for example, luminance "Target Lv" of a sub-pixel to be compensated in a forward viewing angle is obtained by a sum of display uneven luminance "mura Lv" of a sub-pixel to be compensated in a forward viewing angle and compensation values of a sub-pixel to be compensated in a forward viewing angle; the luminance "Target Lv" of a sub-pixel to be compensated in a side viewing angle is obtained by a sum of display uneven luminance "mura Lv" of a sub-pixel to be compensated in a side viewing angle and compensation values of a sub-pixel to be compensated in a side viewing angle), so that the display panel may be compensated for the display uniformity in different viewing angles at the same time, thereby improving the display uniformity of the display panel in different viewing angles.

Figure 6A:
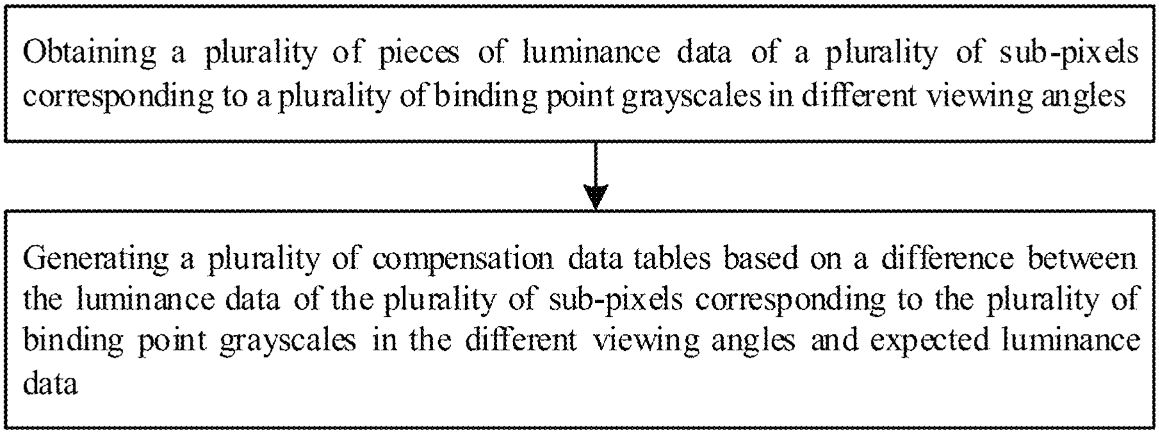
FIGS. 6A to 6B are a flowchart of a method for generating a compensation data table according to an embodiment of the present disclosure.
Figure 6B:
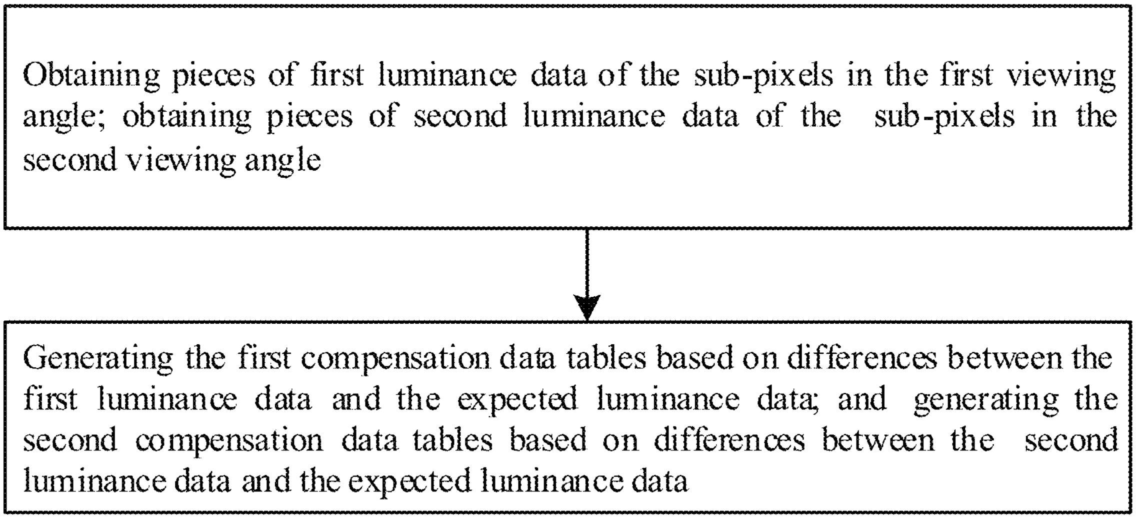
Figure 7:
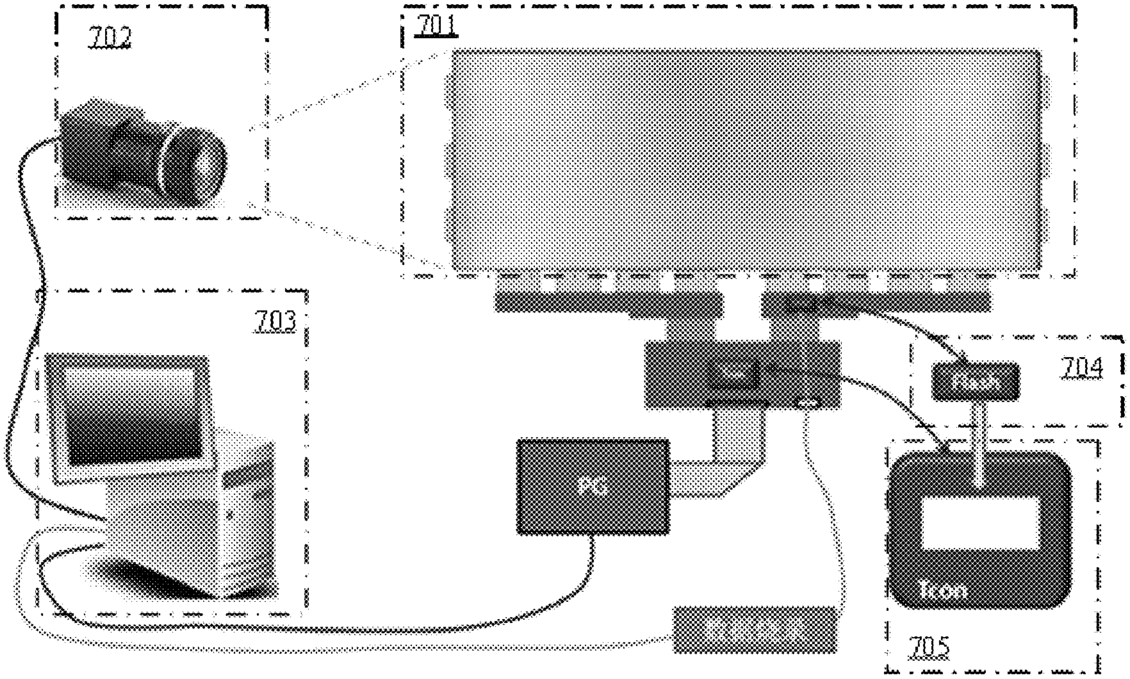
FIG. 7 is a system diagram of a method for generating a compensation data table according to an embodiment of the present disclosure.

FIGS. 6A to 6B are a flowchart of a method for generating a compensation data table according to an embodiment of the present disclosure. FIG. 7 is a system diagram of a method for generating a compensation data table according to an embodiment of the present disclosure. The present disclosure also provides a method for generating a compensation data table for compensating luminance uniformity of the display panel 701. The display panel 701 includes a plurality of sub-pixels. The generation method of the compensation data table includes:

- obtaining a plurality of pieces of luminance data of a plurality of sub-pixels corresponding to a plurality of binding point grayscales in different viewing angles; and
- generating a plurality of compensation data tables based on differences between the luminance data of the plurality of sub-pixels corresponding to the plurality of binding point grayscales in the different viewing angles and the expected luminance data.

The plurality of compensation data tables include a plurality of first compensation data tables in the first viewing angle and a plurality of second compensation data tables in the second viewing angle. The plurality of first compensation data tables are configured to compensate for a first display luminance of a first sub-pixel to be compensated included in the first to-be-compensated sub-pixel set. The plurality of second compensation data tables are configured to compensate for a second display luminance of a second sub-pixel to be compensated included in the second to-be-compensated sub-pixel set. The first to-be-compensated sub-pixel set is adjacent to the second to-be-compensated sub-pixel set, and the first viewing angle is different row the second viewing angle.

Alternatively, a plurality of the compensation data tables are configured to compensate display luminance of the sub-pixels to be compensated based on coordinate information of the sub-pixels to be compensated.

Alternatively, the first viewing angle is one of a front viewing angle and a side viewing angle (that is, one of the first viewing angle and the second viewing angle is a viewing angle perpendicular to a surface of the display panel 701 at the center of the display panel 701). The second viewing angle is the other of the front viewing angle and the side viewing angle. Alternatively, the first viewing angle with respect to the second viewing angle may be in a range of from −70° to +70°. Alternatively, the side view angles have the same angle absolute value, the luminance data may be fused to generate a compensation data table the side viewing angles (e.g. the side viewing angles includes +70° and −70°, the luminance data corresponding to the same grey scale in the side viewing angles of −70° and +70° may be fused to generate a compensation data table corresponding to the side viewing angles of ±70°), to reduce the amount of storage.

Alternatively, the desired luminance data may be an average luminance corresponding to a matrix region centered at the center of the display panel 701. It will be appreciated that the desired luminance data may be different for different grayscales. The desired luminance data may also be different for different viewing angles.

Alternatively, referring to FIG. 6B, the step of obtaining a plurality of pieces of luminance data of a plurality of sub-pixels corresponding to a plurality of binding point grayscales in different viewing angles further includes: obtaining a plurality of pieces of first luminance data of the plurality of sub-pixels corresponding to a plurality of first binding point grayscales in the first viewing angle; obtaining a plurality of pieces of second luminance data of the plurality of sub-pixels corresponding to a plurality of second binding point grayscales in the second viewing angle. The binding point grayscale includes the first binding point grayscale and the second binding point grayscale.

The step of generating the plurality of compensation data tables based on the differences between the luminance data of the plurality of sub-pixels corresponding to the plurality of binding point grayscales in the different viewing angles and the expected luminance data further includes: generating a plurality of the first compensation data tables based on differences between the plurality of pieces of first luminance data and the corresponding expected luminance data; and generating a plurality of pieces of the second compensation data tables based on differences between the plurality of second luminance data and the corresponding expected luminance data.

Alternatively, the first to-be-compensated sub-pixel set includes a plurality of first sub-pixels to be compensated located in the odd row or the odd column, and the second to-be-compensated sub-pixel set includes a plurality of second sub-pixels to be compensated located in the even row or the even column. The plurality of first compensation data tables are configured to compensate for the first display luminance corresponding to the plurality of first sub-pixels to be compensated located in the odd row or the odd column, and the second compensation data tables are configured to compensate for the display luminance corresponding to the plurality of second sub-pixels to be compensated located in the even row or the even column.

Alternatively, the first to-be-compensated sub-pixel set includes at least two adjacent rows of the first sub-pixels or at least two adjacent columns of the first sub-pixels, and the second to-be-compensated sub-pixel set includes at least two adjacent rows of the second sub-pixels or at least two adjacent columns of the second sub-pixels. The row of first sub-pixels or the column of the first sub-pixels includes a plurality of the first sub-pixels to be compensated, and the row of second sub-pixels or the column of the second sub-pixels includes a plurality of the second sub-pixels to be compensated. The plurality of first compensation data tables are configured to compensate for the first display luminance corresponding to the plurality of first sub-pixels to be compensated, and the second compensation data tables are configured to compensate for the display luminance corresponding to the plurality of second sub-pixels to be compensated.

Alternatively, the first to-be-compensated sub-pixel set includes a plurality of the first sub-pixels to be compensated located in the odd row and the odd column and located in the even row and the even column. The second to-be-compensated sub-pixel set includes a plurality of the second sub-pixels to be compensated located in the odd row and the even column and located in the even row and the odd column. The plurality of first compensation data tables are configured to compensate for a first display luminance of the plurality of first sub-pixels to be compensated located in the odd row and the odd column and located in the even row and the even column, and the second compensation data tables are configured to compensate for a second display luminance corresponding to the plurality of second sub-pixels to be compensated located in the odd row and the even column and located in the even row and the odd column.

Alternatively, when the compensation data table is generated, a device such as a camera 702 may be used to obtain a plurality of pieces of luminance data of a plurality of sub-pixels corresponding to a plurality of binding point grayscales in different viewing angles, so as to acquire a position at which display non-uniformity occurs in the display panel 701.

Alternatively, the difference between the plurality of pieces of the first luminance data and the corresponding desired luminance data may be calculated by a device such as a computer 703 to generate a plurality of first compensation data tables. Alternatively, the difference between the plurality of pieces of the first luminance data and the corresponding desired luminance data may be calculated by a device such as a computer 703 to generate a plurality of second compensation data tables.

Alternatively, the plurality of generated first compensation data tables and the plurality of generated second compensation data tables may be stored in the memory 704 to read the plurality of compensation data tables stored in the memory 704 by the control module 705 when compensation of the sub-pixels to be compensated is required. Alternatively, the control module 705 includes a timing controller or the like.

Alternatively, display data corresponding to different binding point grayscales may be provided to the display panel by the image control module PG so that the camera 702 obtains a position of a sub-pixel to be compensated with display uniformity in the display panel.

Figure 8:
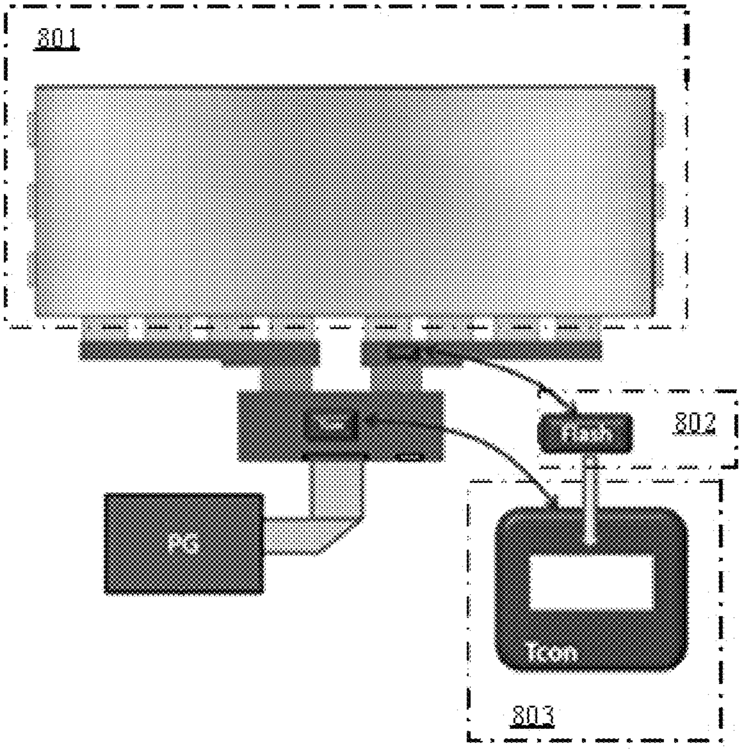
FIG. 8 is a schematic block diagram of a display device according to an embodiment of the present disclosure.

FIG. 8 is a schematic block diagram of a display device according to an embodiment of the present disclosure. The present disclosure further provides a display apparatus including a display panel 801, a storage module 802, and a control module 803.

The display panel 801 includes a plurality of sub-pixels. Where the plurality of sub-pixels includes a first sub-pixel to be compensated and a second sub-pixel to be compensated. The display panel 801 includes a first to-be-compensated sub-pixel set and a second to-be-compensated sub-pixel set adjacent with each other.

Alternatively, the first to-be-compensated sub-pixel set includes a plurality of the first sub-pixels to be compensated located in odd rows or odd columns. The second to-be-compensated sub-pixel set includes a plurality of the second sub-pixels to be compensated located in even rows or even columns.

Alternatively, the first to-be-compensated sub-pixel set includes at least two adjacent first sub-pixel rows or at least two adjacent first sub-pixel columns, and the second to-be-compensated sub-pixel set includes at least two adjacent second sub-pixel rows or at least two adjacent second sub-pixel columns. Where the first sub-pixel row or the first sub-pixel column includes a plurality of the first sub-pixels to be compensated, and the second sub-pixel row or the second sub-pixel column includes a plurality of the second sub-pixels to be compensated.

Alternatively, the first to-be-compensated sub-pixel set includes a plurality of the first sub-pixels to be compensated located in odd rows and odd columns and located in even rows and even columns, and the to-be-compensated sub-pixel set includes a plurality of the second sub-pixels to be compensated located in odd rows and even columns and located in even rows and odd columns.

The storage module 802 is configured to store a plurality of first compensation data tables and a plurality of second compensation data tables. Where the plurality of the first compensation data tables correspond to a first viewing angle, the plurality of the second compensation data tables correspond to a second viewing angle, and the first viewing angle is different from the second viewing angle. Alternatively, the storage module 802 includes a memory. Alternatively, the memory module 802 includes a flash memory or the like.

The control module 803 is configured to the plurality of the first compensation data tables in the first viewing angle for the first to-be-compensated sub-pixel set, as a first target compensation data set, and generate a first target compensation value based on the first target compensation data set to compensate for first display luminance of a first sub-pixel to be compensated comprised in the first to-be-compensated sub-pixel set; and select the plurality of the second compensation data tables in the second viewing angle for the second to-be-compensated sub-pixel set, as a second target compensation data set, and generate a second target compensation value based on the second target compensation data set to compensate for second display luminance of a second sub-pixel to be compensated comprised in the second to-be-compensated sub-pixel set. Alternatively, the control module 803 includes a timing controller or the like.

Alternatively, the display device further includes an image control module PG configured to provide display data to the display panel.

It will be appreciated that the display device includes a movable display device (such as a notebook computer, a mobile phone, and the like), a fixed terminal (such as a desktop computer, a television, and the like), a measuring device (such as a sports wristband, a thermometer, and the like), and the like.

The principles and embodiments of the present disclosure have been described with reference to specific examples, the description of which is merely intended to aid in the understanding of the method of the present disclosure and its core idea. Meantime, variations will occur to those skilled in the art in both the detailed description and the scope of application in accordance with the teachings of the present disclosure. In view of the foregoing, the present description should not be construed as limiting the application.

What is claimed is:

1. A display compensation method for a display panel, comprising:

selecting a plurality of first compensation data tables for a first to-be-compensated sub-pixel set in a first viewing angle, as a first target compensation data set, and selecting a plurality of second compensation data tables for a second to-be-compensated sub-pixel set in a second viewing angle, as a second target compensation data set; wherein the first to-be-compensated sub-pixel set is adjacent to the second to-be-compensated sub-pixel set, and the first viewing angle is different from the second viewing angle; and generating a first target compensation value based on the first target compensation data set to compensate for a first display luminance of a first sub-pixel to be compensated comprised in the first to-be-compensated sub-pixel set; generating a second target compensation value based on the second target compensation data set to compensate for a second display luminance of a second sub-pixel to be compensated comprised in the second to-be-compensated sub-pixel set, wherein the first and second viewing angles refer to angles of viewing directions from different positions of a user with respect to a normal line of the display panel perpendicular to a surface of the display panel at a center of the display panel.

2. The display compensation method of claim 1, wherein the first sub-pixel to be compensated comprised in the first to-be-compensated sub-pixel set is one of a plurality of first sub-pixels to be compensated located in an odd row or an odd column; and the second sub-pixel to be compensated comprised in the second to-be-compensated sub-pixel set is one of a plurality of second sub-pixels to be compensated located in an even row or an even column.

3. The display compensation method of claim 1, wherein the first to-be-compensated sub-pixel set comprises at least two adjacent rows of first sub-pixel rows or at least two adjacent columns of first sub-pixel columns, wherein the first sub-pixel to be compensated comprised in the first sub-pixel row or the first sub-pixel column is one of a plurality of first sub-pixels to be compensated; and the second to-be-compensated sub-pixel set comprises at least two adjacent rows of second sub-pixel rows or at least two adjacent columns of second sub-pixel columns, wherein the second sub-pixel to be compensated comprised in the second sub-pixel row or the second sub-pixel column is one of a plurality of second sub-pixels to be compensated.

4. The display compensation method of claim 1, wherein the first sub-pixel to be compensated comprised in the first to-be-compensated sub-pixel set is provided to include a plurality of first sub-pixels to be compensated located in an odd row and an odd column and located in an even row and an even column, and the second sub-pixel to be compensated comprised in the second to-be-compensated sub-pixel set is provided to include a plurality of second sub-pixels to be compensated located in the odd row and the even column and located in the even row and the odd column.

5. The display compensation method of claim 1, wherein the generating of the first target compensation value based on the first target compensation data set to compensate for the first display luminance of the first sub-pixel to be compensated comprised in the first to-be-compensated sub-pixel set comprises:

determining two first target compensation data tables respectively from the first target compensation data set based on a first grayscale corresponding to the first sub-pixel to be compensated, wherein the first grayscale is between two first binding point grayscales respectively corresponding to the two first target compensation data tables;

determining two first reference compensation values corresponding to first coordinate information of the first sub-pixel to be compensated respectively in the two first target compensation data tables based on the two first target compensation data tables and the first coordinate information of the first sub-pixel to be compensated; and generating the first target compensation value from the two first reference compensation values, and the generating of the second target compensation value based on the second target compensation data set to compensate for the second display luminance of the second sub-pixel to be compensated comprised in the second to-be-compensated sub-pixel set comprises:

determining two second target compensation data tables respectively from the second target compensation data set based on a second grayscale corresponding to the second sub-pixel to be compensated, wherein the second grayscale is between two second binding point grayscales respectively corresponding to the two second target compensation data tables;

determining two second reference compensation values corresponding to second coordinate information of the second sub-pixel to be compensated respectively in the two second target compensation data tables based on the two second target compensation data tables and the second coordinate information of the second sub-pixel to be compensated; and generating the second target compensation value from the two second reference compensation value.

6. The display compensation method of claim 5, wherein the determining of the two first reference compensation values corresponding to the first coordinate information of the first sub-pixel to be compensated respectively in the two first target compensation data tables based on the two first target compensation data tables and the first coordinate information of the first sub-pixel to be compensated comprises:

determining two first target compensation data blocks corresponding to the first coordinate information of the first sub-pixel to be compensated, respectively in the two first target compensation data tables;

obtaining two first compensation values corresponding to a mapping position of the first coordinate information of the first sub-pixel to be compensated respectively from the two first target compensation data blocks as the two first reference compensation values, based on compensation values at corresponding vertex positions of the two first target compensation data blocks and the first coordinate information of the first sub-pixel to be compensated;

the determining of the two second reference compensation values corresponding to the second coordinate information of the second sub-pixel to be compensated in the two second target compensation data tables based on the two second target compensation data tables and the second coordinate information of the second sub-pixel to be compensated comprises:

determining two second target compensation data blocks corresponding to the second coordinate information of the second sub-pixel to be compensated, respectively in the two second target compensation data tables;

obtaining two second compensation values corresponding to a mapping position of the second coordinate information of the second sub-pixel to be compensated respectively from the two second target compensation data blocks as the two second reference compensation values, based on compensation values at corresponding vertex positions of the two second target compensation data blocks and the second coordinate information of the second sub-pixel to be compensated.

7. The display compensation method of claim 6, wherein the generating of the first target compensation value from the two first reference compensation values comprises:

performing a linear interpolation operation on the two first reference compensation values to obtain the first target compensation value;

the generating of the second target compensation value from the two second reference compensation values comprises:

performing the linear interpolation operation on the two second reference compensation values to obtain the second target compensation value.

8. The display compensation method of claim 1, wherein with respect to the second viewing angle, the first viewing angle is in a range of from—70° to +70°.

9. The display compensation method of claim 1, wherein the plurality of the second compensation data tables correspond to different side viewing angles.

10. The display compensation method of claim 1, wherein the second viewing angle comprises a left side viewing angle, a right side viewing angle, a top viewing angle, and a bottom viewing angle.

11. A method for generating a compensation data table, for compensating luminance uniformity of a display panel comprising a plurality of sub-pixels, the method comprises:

obtaining a plurality of pieces of luminance data of a plurality of sub-pixels corresponding to a plurality of binding point grayscales in different viewing angles; and generating a plurality of compensation data tables based on a difference between the luminance data of the plurality of sub-pixels corresponding to the plurality of binding point grayscales in the different viewing angles and expected luminance data, wherein the plurality of compensation data tables comprise a plurality of first compensation data tables in the first viewing angle and a plurality of second compensation data tables in the second viewing angle, the plurality of first compensation data tables are configured to compensate for first display luminance of a first sub-pixel to be compensated comprised in a first to-be-compensated sub-pixel set, and the plurality of second compensation data tables are configured to compensate for second display luminance of a second sub-pixel to be compensated comprised in a second to-be-compensated sub-pixel set, the first to-be-compensated sub-pixel set is adjacent to the second to-be-compensated sub-pixel set, and the first viewing angle is different from the second viewing angle.

12. The method of claim 11, wherein the obtaining of the plurality of pieces of luminance data of the plurality of sub-pixels corresponding to the plurality of binding point grayscales in the different viewing angles comprises:

obtaining a plurality of pieces of first luminance data of the plurality of sub-pixels corresponding to a plurality of first binding point grayscales in the first viewing angle; obtaining a plurality of pieces of second luminance data of the plurality of sub-pixels corresponding to a plurality of second binding point grayscales in the second viewing angle, wherein the binding point grayscale comprises the first binding point grayscale and the second binding point grayscale, the generating of the plurality of compensation data tables based on the difference between the luminance data of the plurality of sub-pixels corresponding to the plurality of binding point grayscales in the different viewing angles and the expected luminance data comprising:

generating the plurality of first compensation data tables based on differences between the plurality of pieces of first luminance data and the corresponding expected luminance data; and generating a plurality of the second compensation data tables based on differences between the plurality of pieces of second luminance data and the corresponding expected luminance data, wherein the first to-be-compensated sub-pixel set comprises a plurality of first sub-pixels to be compensated located in an odd row or an odd column, and the second to-be-compensated sub-pixel set comprises a plurality of second sub-pixels to be compensated located in an even row or an even column, the plurality of first compensation data tables are configured to compensate for the first display luminance corresponding to the plurality of first sub-pixels to be compensated located in the odd row or the odd column, and the second compensation data tables are configured to compensate for the display luminance corresponding to the plurality of second sub-pixels to be compensated located in the even row or the even column.

13. A display device, comprising:

a display panel comprising a first to-be-compensated sub-pixel set and a second to-be-compensated sub-pixel set adjacent with each other;

a storage module configured to store a plurality of first compensation data tables and a plurality of second compensation data tables, wherein the plurality of the first compensation data tables correspond to a first viewing angle, the plurality of the second compensation data tables correspond to a second viewing angle, and the first viewing angle is different from the second viewing angle; and a control module configured to select the plurality of the first compensation data tables in the first viewing angle for the first to-be-compensated sub-pixel set, as a first target compensation data set, and generate a first target compensation value based on the first target compensation data set to compensate for first display luminance of a first sub-pixel to be compensated comprised in the first to-be-compensated sub-pixel set; and select the plurality of the second compensation data tables in the second viewing angle for the second to-be-compensated sub-pixel set, as a second target compensation data set, and generate a second target compensation value based on the second target compensation data set to compensate for second display luminance of a second sub-pixel to be compensated comprised in the second to-be-compensated sub-pixel set, wherein the first and second viewing angles refer to angles of viewing directions from different positions of a user with respect to a normal line of the display panel perpendicular to a surface of the display panel at a center of the display panel.

14. The display device of claim 13, wherein the first sub-pixel to be compensated comprised in the first to-be-compensated sub-pixel set is one of a plurality of first sub-pixels to be compensated located in an odd row or an odd column; and the second sub-pixel to be compensated comprised in the second to-be-compensated sub-pixel set is one of a plurality of second sub-pixels to be compensated located in an even row or an even column.

15. The display device of claim 13, wherein the first sub-pixel to be compensated comprised in the first to-be-compensated sub-pixel set is one of a plurality of first sub-pixels to be compensated located in an odd row and an odd column and located in an even row and an even column, and the second sub-pixel to be compensated comprised in the second to-be-compensated sub-pixel set is one of a plurality of second sub-pixels to be compensated located in the odd row and the even column and located in the even row and the odd column.

* * * * *